US012669985B2

(12) United States Patent
Bierman et al.

(10) Patent No.: US 12,669,985 B2
(45) Date of Patent: Jun. 30, 2026

(54) COMPILE-TIME CHECKING FOR EXHAUSTIVE SWITCH STATEMENTS AND EXPRESSIONS

(71) Applicant: Oracle International Corporation, Redwood Shores, CA (US)

(72) Inventors: Gavin Mark Bierman, Cambridge (GB); Brian Goetz, Williston, VT (US); Jan Lahoda, Polna (CZ)

(73) Assignee: Oracle International Corporation, Redwood Shores, CA (US)

( * ) Notice: Subject to any disclaimer, the term of this patent is extended or adjusted under 35 U.S.C. 154(b) by 244 days.

(21) Appl. No.: 18/463,042

(22) Filed: Sep. 7, 2023

(65) Prior Publication Data

US 2024/0338186 A1 Oct. 10, 2024

Related U.S. Application Data

(60) Provisional application No. 63/494,719, filed on Apr. 6, 2023.

(51) Int. Cl.
*G06F 8/41* (2018.01)
(52) U.S. Cl.
CPC .................................... *G06F 8/433* (2013.01)
(58) Field of Classification Search
CPC ....................................................... G06F 8/433
See application file for complete search history.

(56) References Cited

U.S. PATENT DOCUMENTS 7,086,039 B2 * 8/2006 Lam ........................ G06F 8/443
                                              717/136
8,387,003 B2 * 2/2013 Darcy ................. G06F 16/9014
                                              717/106
(Continued)

FOREIGN PATENT DOCUMENTS

CN        107203403 A * 9/2017 ............. G06F 8/425
EP          3607432 B1 * 4/2023 ............. G06F 8/436
(Continued)

OTHER PUBLICATIONS

M.J. de Bruijn; "Switch Statement Disassembly"; Master of Science in Software Engineering at the Open University, faculty of Management, Science and Technology Master Software Engineering; 2022.*
(Continued)

*Primary Examiner* — Francisco J Aponte
(74) *Attorney, Agent, or Firm* — Invoke

(57) ABSTRACT

Techniques for compiling switch blocks are disclosed. One or more embodiments analyze and rewrite a set of pattern labels in a switch block in a compile-time process for determining whether the switch block is exhaustive. At compile-time, a system populates a set with case labels from a switch block. The system applies a set of rules to iteratively re-write pattern labels in the set and checks whether the re-written set, and hence the original switch block, is exhaustive. If the compiler determines that (a) the set does not appear to be exhaustive, and (b) the set includes patterns labels, then the compiler determines whether the set may be rewritten before further analysis. The compiler iteratively re-writes and re-analyzes the case label set for exhaustivity until the case label set is determined to be exhaustive or cannot be rewritten further.

20 Claims, 8 Drawing Sheets

(56) References Cited

U.S. PATENT DOCUMENTS

| | | | | |
|---|---|---|---|---|
| 8,438,536 | B2 * | 5/2013 | Buckley | G06F 8/4441 |
| | | | | 717/114 |
| 9,519,465 | B2 * | 12/2016 | Bernecker | G06F 8/41 |
| 10,445,077 | B2 * | 10/2019 | Moiseev | G06F 30/3308 |
| 2004/0210886 | A1 * | 10/2004 | Jarp | G06F 8/4451 |
| | | | | 712/226 |
| 2011/0099535 | A1 * | 4/2011 | Buckley | G06F 8/4441 |
| | | | | 717/114 |
| 2015/0356294 | A1 * | 12/2015 | Tan | G06F 9/30054 |
| | | | | 726/22 |
| 2016/0170725 | A1 * | 6/2016 | Holton | G06F 8/451 |
| | | | | 717/157 |
| 2018/0357051 | A1 * | 12/2018 | Puszkiewicz | G06F 9/45512 |
| 2019/0056921 | A1 * | 2/2019 | Pan | G06F 7/00 |
| 2019/0146765 | A1 * | 5/2019 | Pan | G06F 7/00 |
| | | | | 717/152 |
| 2020/0272443 | A1 * | 8/2020 | Fu | G06F 18/28 |
| 2022/0075651 | A1 * | 3/2022 | Harboe | G06F 8/445 |
| 2024/0078182 | A1 * | 3/2024 | Foley | G06F 12/0833 |

FOREIGN PATENT DOCUMENTS

| | | | | | |
|---|---|---|---|---|---|
| KR | 20220037721 | A | * | 3/2022 | G06F 8/433 |
| WO | WO-2017014318 | A1 | * | 1/2017 | G06F 8/31 |
| WO | WO-2022248933 | A1 | * | 12/2022 | G06F 21/6254 |

OTHER PUBLICATIONS

Gao, Xiangyu, et al. "Switch code generation using program synthesis." Proceedings of the Annual conference of the ACM Special Interest Group on Data Communication on the applications, technologies, architectures, and protocols for computer communication. 2020.*

Fengyun L., "A Generic Algorithm for Checking Exhaustivity of Pattern Matching (Short Paper)", Retrieved from https://conf.researchr.org/details/scala-2016/scala-2016/17/A-Generic-Algorithm-for-Checking-Exhaustivity-of-Pattern-Matching-Short-Paper-, Oct. 30, 2016, pp. 3.

* cited by examiner

Class File
200

Virtual Machine Memory Layout
300

FIG. 4

Frame
400

Local Variables
401

Operand Stack
402

Run-time Constant Pool Reference Table
403

FIG. 6B

```
                        Source Code Files
                              601

⋮ record R(T t, I i) {}
record T(S s) {}
sealed interface I permits X, Y
{}
final class X implements I {}
final class Y implements I {}
sealed interface S permits A, B
{}
final class A implements S {}
final class B implements S {}
                               ⋮
```

```
                      Switch Statement
                            602 void test(R r) {
        switch (r) {
            case R(T t, X x) -->
            case R(T(A a), Y y) -->
            case R(T(B b), Y y) -->
```

⋮

COMPILE-TIME CHECKING FOR EXHAUSTIVE SWITCH STATEMENTS AND EXPRESSIONS

INCORPORATION BY REFERENCE; DISCLAIMER

The following application is hereby incorporated by reference: application No. 63/494,719 filed on Apr. 6, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to compile-time checking of switch statements and expressions. In particular, the present disclosure relates to analyzing and re-writing switch blocks that have patterns as labels at compile time to determine whether the switch statements/expressions are exhaustive.

BACKGROUND

A switch block in Java may be implemented in switch statements and switch expressions. Switch statements perform an evaluation of values and output a value as a result. Switch expressions perform evaluations but do not output a result. Switch statements and expressions in Java are used to perform different actions based on the value of a given expression. They provide a concise way to write multiple if-then-else statements. At compile-time, a compiler analyzes switch statements/expressions to determine whether they are exhaustive. A switch statement/expression is considered exhaustive when it covers all possible values of the expression being switched over. This means that every possible value must be handled by one of the case clauses.

If the switch statement/expression is not exhaustive, the Java compiler can generate a compile-time error indicating that the switch statement/expression is incomplete. This error message is intended to prevent the programmer from accidentally leaving out a case, which could result in unexpected behavior at runtime.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example frame in block diagram form according to an embodiment;

FIGS. 6A and 6B illustrate an example embodiment for checking a source code switch statement for exhaustiveness in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 TYPE PATTERNS AND RECORD PATTERNS
   2.3 EXAMPLE VIRTUAL MACHINE ARCHITECTURE
   2.4 LOADING, LINKING, AND INITIALIZING
3. REWRITING SWITCH STATEMENT PATTERN LABELS FOR EXHAUSTIVENESS CHECKING
4. EXAMPLE EMBODIMENT
5. MISCELLANEOUS; EXTENSIONS
6. HARDWARE OVERVIEW
7. COMPUTER NETWORKS AND CLOUD NETWORKS
8. MICROSERVICE APPLICATIONS

1. GENERAL OVERVIEW

One or more embodiments analyze and rewrite a set of pattern labels in a switch block in a compile-time process for determining whether the switch block is exhaustive. A system populates a set with case labels from a switch block. The system applies a set of rules to iteratively re-write pattern labels in the set and checks whether the re-written set, and hence the original switch block, is exhaustive. According to one embodiment, the compiler performs an initial analysis of the set of case labels to determine whether the switch block covers all possible values of the expression being switched over. If the compiler determines that (a) the set does not appear to be exhaustive, and (b) the set includes patterns labels, then the compiler determines whether the set may be rewritten before further analysis. For example, two or more record patterns could be combined and replaced with a single record pattern. The compiler may iteratively re-write the case label set and re-analyze it in order to check the switch block for exhaustivity. A switch block having an initial case label set which does not initially appear to cover all possible values of the expression being switched over may be determined as exhaustive after re-writing the case label set. If the system determines that a switch block is not exhaustive, and either the case label set cannot be further re-written, or that the re-written set does not determine an exhaustive switch block, the compiler can generate an error notification. If, on the other hand, the system determines that a switch block is exhaustive (possibly after extensive rewriting and analysis of the case label set), the system proceeds with compiling the source code.

One or more embodiments described in this Specification and/or recited in the claims may not be included in this General Overview section.

2. ARCHITECTURAL OVERVIEW

Figure 1:
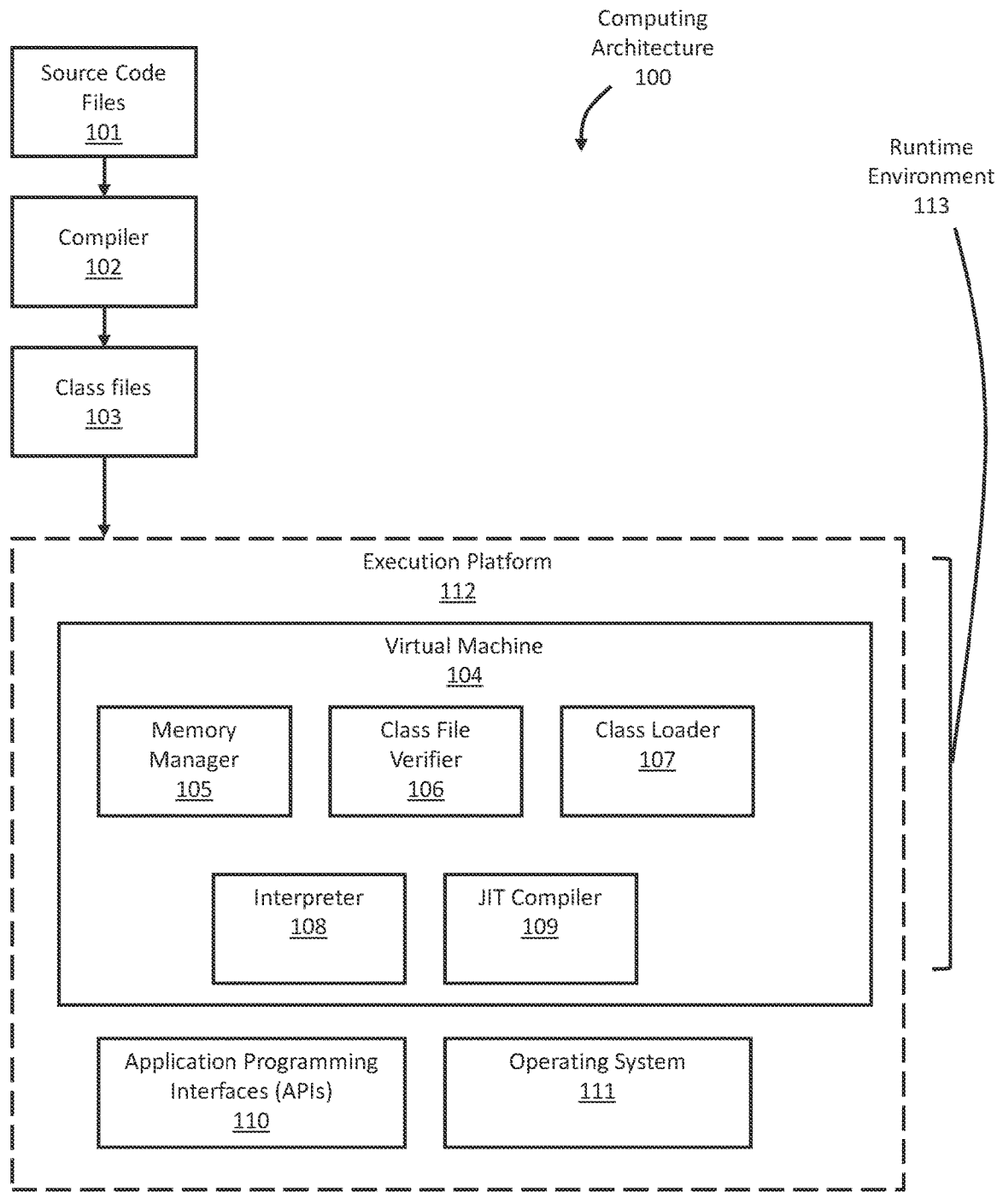
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
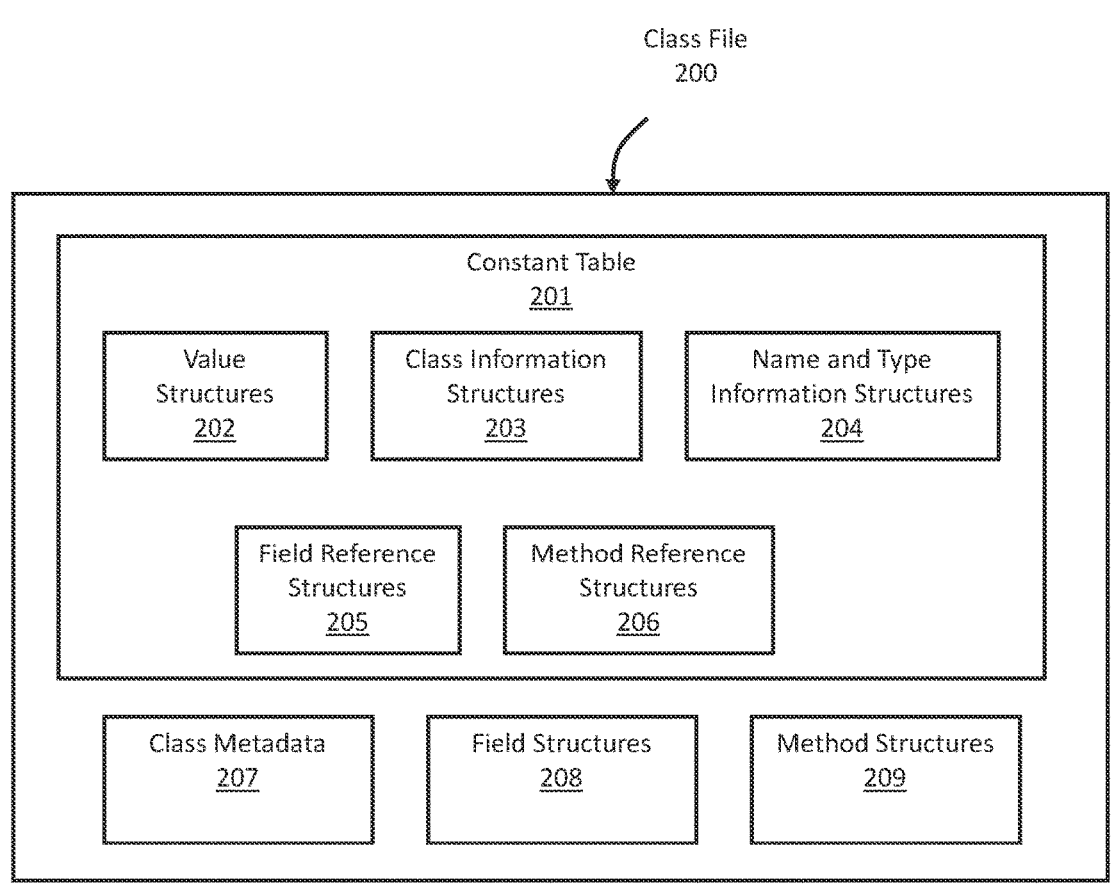
FIG. 2 is a block diagram illustrating an embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
{
    int add12and13( ) {
        return B.addTwo(12, 13);
    }
}
```

In the above example, the Java method add12and13 is defined in class A, takes no parameters, and returns an integer. The body of method add12 and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Type Patterns and Record Patterns

A type pattern includes a type name and a variable to initialize with a result. The following case labels of a switch statement convert different types to a double using type patterns Integer i and Float f:

```
case Integer i -> i.doubleValue( );
case Float f -> f.doubleValue( );
```

A record pattern consists of a record class type and a pattern list which is used to match against the corresponding record component values.

For example, given the record declaration: record Point (int i, int j) { }, a value v matches the record pattern Point (int i, int j) if it is an instance of the record type Point. If so, the pattern variable i is initialized with the result of invoking the accessor method corresponding to i on the value v, and the pattern variable j is initialized to the result of invoking the accessor method corresponding to j on the value v.

An expression is compatible with a record pattern if it could be cast to the record type in the pattern without requiring an unchecked conversion.

2.3 Example Virtual Machine Architecture

Figure 3:
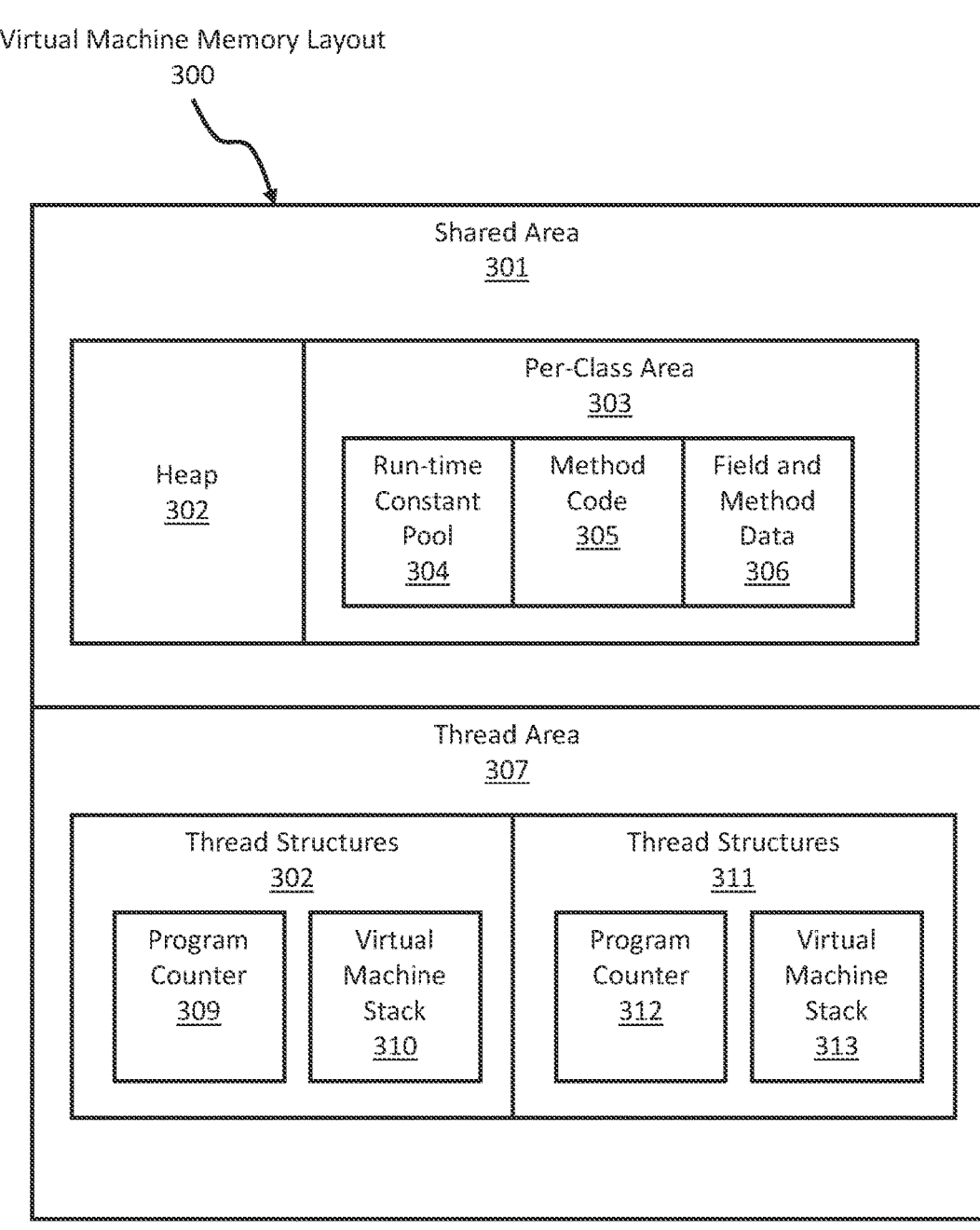
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
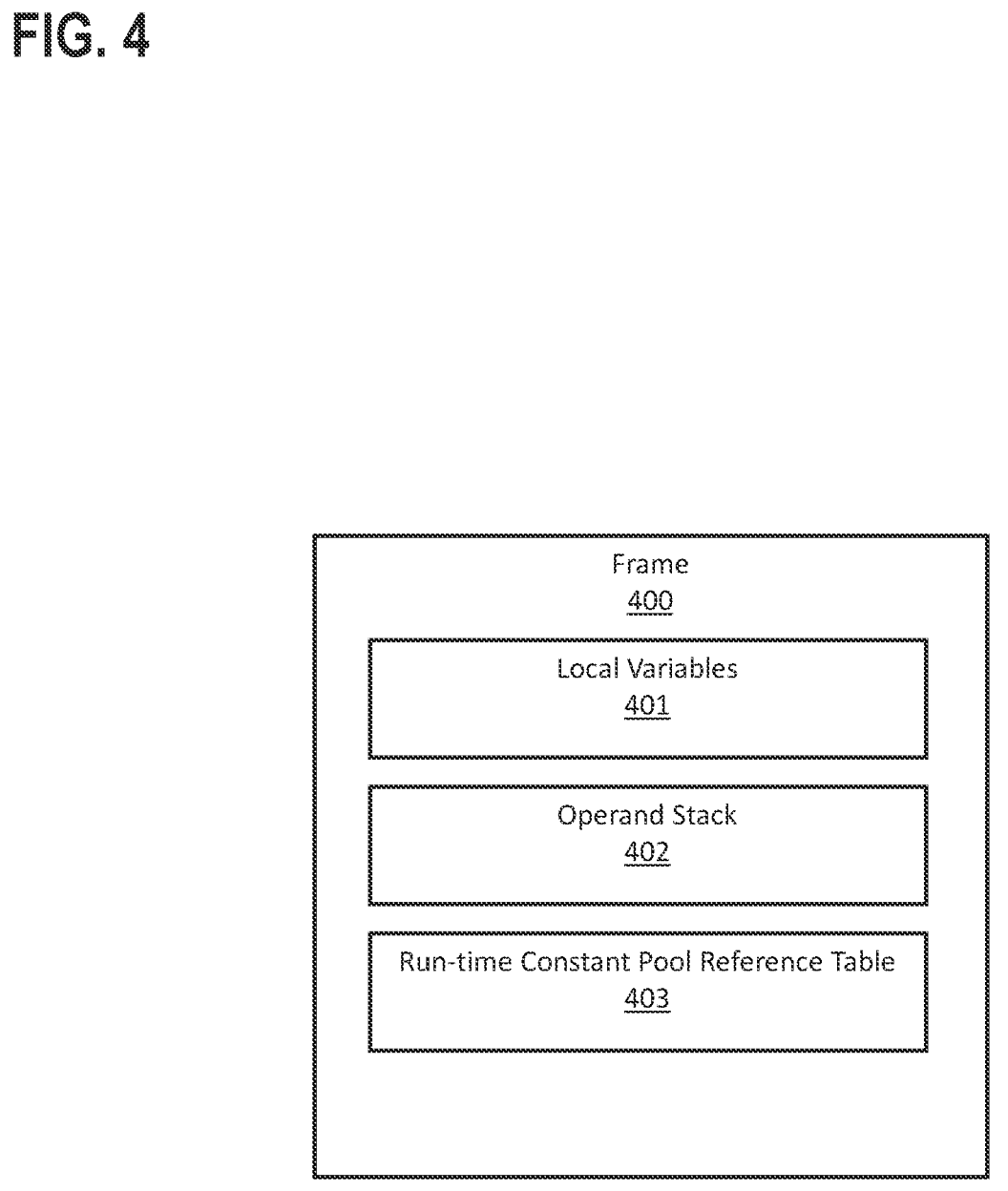

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.4 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. REWRITING SWITCH BLOCK PATTERN LABELS FOR EXHAUSTIVENESS CHECKING

Figure 5:
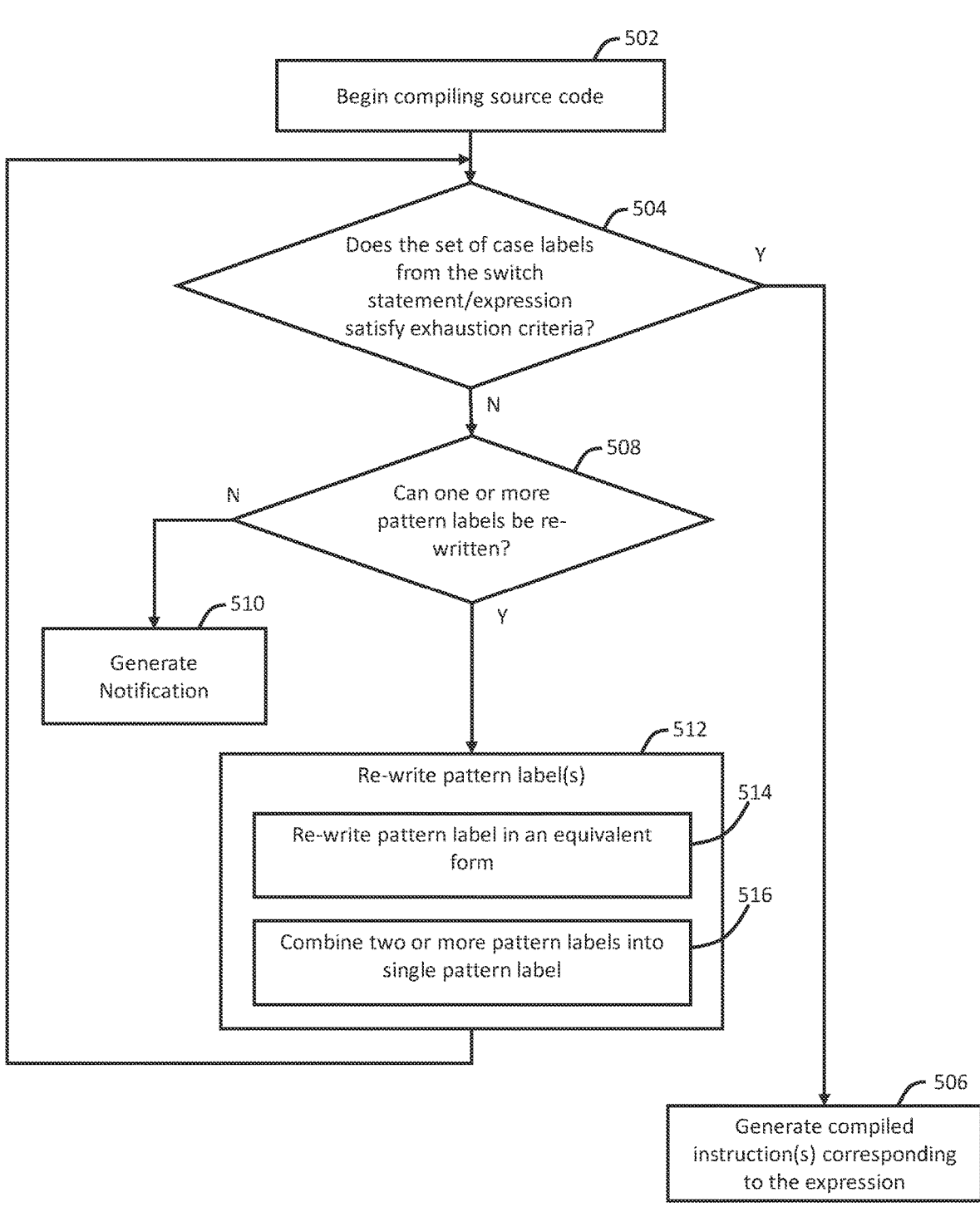
FIG. 5 illustrates a set of operations for rewriting switch statement expressions at compile time in accordance with one or more embodiments.

FIG. 5 illustrates an example set of operations for performing a compile-time check for exhaustive switch blocks in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, a compiler begins compiling source code that includes a switch statement (Operation 502). The switch statement evaluates an expression, matching the expression's value against a series of case clauses/labels, and executes the statements associated with the first case clause/first label it finds that matches the expression's value. If the switch statement includes a default label, the system treats this as a match if no other labels match. As an example, a switch statement may be passed an integer as a parameter. The switch statement may include three constant integer case labels 1, 2, and 3, all with associated operations. It may also include a default label which includes its own associated set of operations. The system performs the operations corresponding to the default label when the value being switched over is not 1, 2, or 3.

In an embodiment, the compiler determines whether the switch statement meets an exhaustion criteria (Operation 504). Specifically, a switch statement is exhaustive if the case clauses/labels cover all the possible values for an expression that is passed as an argument to the switch statement. In an example, a switch statement switches over an expression whose type is an enum class E, which is declared to have three constants A, B, and C. The compiler determines the switch statement is exhaustive if the switch statement includes case labels for each of the enum constants A, B, and C, or if it includes a default label. In an embodiment in which the switch statement includes patterns as case labels, the compiler determines that the switch statement is exhaustive if the set of case labels handle every possible value that the expression being switched over can take. For example, if one of the case labels in the switch statement is a "type pattern" "T t." the system determines whether the switch exhausts all T values.

According to one embodiment, a switch statement may include a type pattern (e.g., String s, Integer i, etc.) as a pattern label. At runtime, a runtime engine will check if the value of the expression being switched over is of the type given by a type pattern label. In particular, to account for subtyping, the test is whether the value can be successfully cast to the type given by the type pattern label. If the runtime engine determines that a value can be successfully cast to the type given by the type pattern label, then the pattern variable given by the type pattern label is initialized with the value. In other words, when the pattern label is a type pattern label, the compiler is checking whether the type of a value matches a label of the switch statement, not a numerical value (e.g., "7"). The compiler checks if all possible types of the value being switched over in a switch statement are exhausted/covered by at least one of the type patterns labels.

In addition, or in the alternative, the switch statement may include a record pattern as a case label. A record pattern contains a test that a value is of a record class type, and a set of other patterns that should be applied to the component values of the record value. At runtime, the runtime engine will check whether the value being switched over can be cast to the record type. If it can then it also checks whether the component values of the value match all of the nested patterns. If all succeed then the record pattern matches. The compiler determines whether all possible record values of the expression being switched over are exhausted, or covered, by at least one of the record pattern labels.

At least based on determining that the switch statement meets the exhaustion criteria, the compiler compiles the source code (Operation 506). For example, the compiler transforms the switch statement source code into bytecode which is executable by a runtime engine to translate the bytecode into machine code.

If the compiler determines that the switch statement does not satisfy the exhaustion criteria, the compiler determines whether the set of case labels appearing in the switch statement may be re-written (Operation 508). A case label set may be rewritten, as described below, with reference to Operation 512.

In an example, a nested record pattern can be replaced in a case label set with a type pattern. Another example is where two or more record patterns may be replaced in a case label set with a single record pattern.

If the compiler determines that the case label set cannot be re-written, the compiler generates a notification (Operation 510). The notification may indicate that the switch statement is not exhaustive. Furthermore, the notification may indicate that executing machine code based on the source code may result in runtime exceptions and errors. The notification may be presented as an error that prevents compilation of the source code. The notification may be presented as a warning, while still allowing compilation of the source code.

If the compiler determines that the case label set may be re-written, the compiler re-writes or replaces one or more pattern labels (Operation 512). For example, the system may replace two or more pattern labels with a single pattern label (Operation 516) or it may replace one pattern label with another equivalent pattern label (Operation 514).

For example, the set of case labels in a switch statement/expression may include the following:

```
R (T t,     X x)
R (T (A a), Y y)
R (T (B b), Y y)
```

Based on type declarations for a record type R and a record type T, the compiler may determine that the second and third patterns may be combined to form a combined pattern R(T(S s), Y y) (Operation 516). The compiler combines the second and third patterns based on determining the record patterns T(A a) and T(B b) recursively combine to form pattern T(S s), which is because the two nested type patterns A a and B b exhaust the type S (i.e., are the only two ways to implement interface S).

In the above example, after re-writing, the case label set is as follows:

```
R (T t, X x)
R (T (S a), Y y)
```

The second column values (X x) and (Y y) can be combined to (I i) since the two type patterns X x and Y y exhaust the type I (i.e., are the only two ways to implement interface I). However, the compiler cannot combine the record pattern labels R(T t, X x) and R(T (S a), Y y) unless every column other than the column being combined is the same. Accordingly, here, the compiler cannot combine the pattern labels unless the patterns Tt and T (S a) are the same.

The compiler, based on a set of declarations in the source code corresponding to type S that the record pattern T(S a) exhausts the type T, so the pattern may be re-written as a type pattern T t (Operation 514). Accordingly, the compiler re-writes the second pattern into an equivalent form, resulting in the following case label set:

```
R (T t, X x)
R (T t, Y y)
```

Based on a set of declarations in the source code corresponding to the classes X and Y, the compiler can determine that the two patterns may be combined. Accordingly, the compiler rewrites the case label set by combining both patterns to the single pattern (Operation 516) resulting in the following case label set:

```
R (T t, I i)
```

The compiler continues in this fashion, iteratively repeating operations 504, 508, and 512 until either (a) the system determines that case label set includes no more pattern labels that may be rewritten and hence the switch statement does not satisfy the exhaustion criteria, or (b) the rewritten case label set, and hence the switch statement, satisfies the exhaustion criteria.

While FIG. 5 describes a set of operations for performing a compile-time check for exhaustive switch statements, embodiments encompass any type of switch blocks, including switch statements and switch expressions.

In the present disclosure and claims, a switch block includes switch statements and switch expressions. Switch statements evaluate an expression and return a value, as illustrated below:

```
switch(o) {
case String s -> System.out.println("It's a string");
default -> System.out.println("something else");
}
```

Switch expressions evaluate an expression, but do not output a value, as described below:

```
int i = switch(o) {
case String s -> 1;
default -> 2;
}
```

4. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 6A:
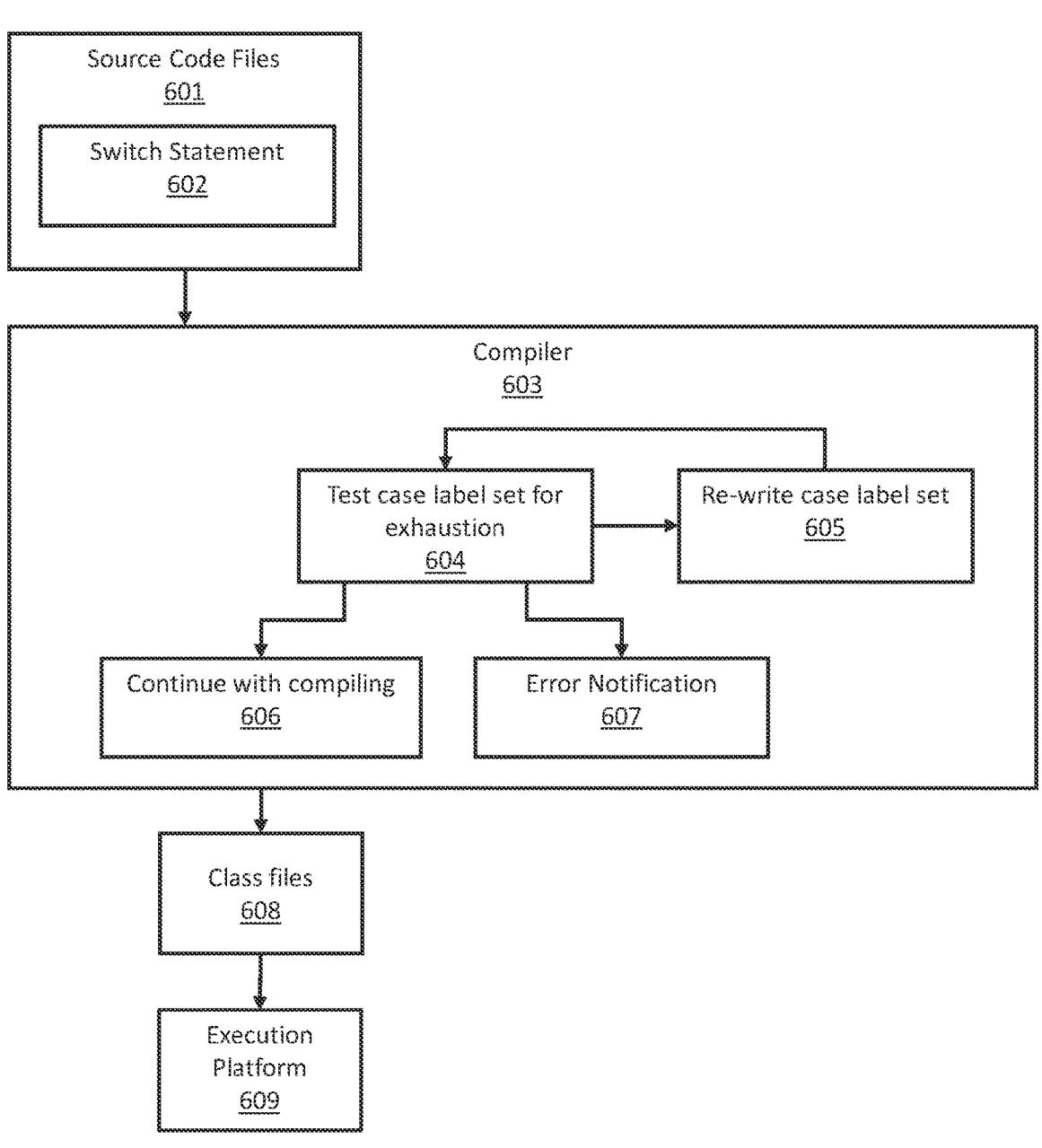

Referring to FIG. 6A, a compiler 603 obtains a set of source code files 601 including at least one switch statement 602. FIG. 6B illustrates an example switch statement 602 that is part of the source code files 601. The ellipses in FIG. 6B represent additional source code to be compiles, which is omitted from FIG. 6B for purposes of describing an example embodiment.

The source code file 601 includes a set of declarations:

```
record R (T t, I i) { }
record T (S s) { }
sealed interface I permits X, Y { }
final class X implements I { }
final class Y implements I { }
sealed interface S permits A, B { }
final class A implements S { }
final class B implements S { }
```

The switch statement 602 is assumed to be switching over an expression (r) of a type "R" and have a switch block containing the following case labels:

```
R(T t,      X x)
R (T (A a), Y y)
R (T (B b), Y y)
```

The case labels all comprise record patterns. The compiler 603 tests the case label set for exhaustion (Operation 604). Initially, it does not satisfy the exhaustion criteria, since the as it does not contain a type pattern for the type R, or a single record pattern of type R with component patterns of type T and I.

Accordingly, the compiler 603 determines whether the case label set may be re-written by (a) replacing record patterns with equivalent record patterns, and (b) combining pairs of record patterns into single record patterns. The compiler 603 determines, based on the set of declarations corresponding to the patterns, that the patterns may be re-written. Accordingly, the compiler re-writes the patterns (Operation 605). By rewriting the set of record patterns to identify iterations of the patterns, the system may identify whether the rewritten case label set can be determined to exhaust the type R.

The compiler 603 re-writes the second and third patterns by combining the patterns to form a pattern R(T(S s), Y y). This follows because (recursively) the record patterns T(A a) and T(B b) combine to form a pattern T(S s), which itself follows because the two nested type patterns A a and B b exhaust the type S.

The case label set is rewritten to the following:

```
R (T t, X x)
R (T (S, a), Y y)
```

The re-written case label set still does not meet the exhaustion criteria (Operation 604). Accordingly, the compiler 603 again attempts to re-writes the case label set (Operation 605). The system rewrites the second pattern to an equivalent form. Since a record pattern T(S a) exhausts the type T, it can be rewritten to a type pattern T t. The resulting case label set is now as follows:

```
R (T t, X x)
R (T t, Y y)
```

The compiler 603 determines whether the patterns may be combined, by determining that the record patterns match the same values in all but the one component that is being combined. For example, in the pattern set above, the record patterns are identical in the first column (i.e., "T t"), and the system attempts to combine them on the second column (e.g., "X x" and "Y y"). The combination is successful due to the declaration:

```
sealed interface I permits X, Y { }
```

Accordingly, the compiler 603 rewrites the case label set by combining both patterns to the single pattern:

```
R (T t, I i)
```

This record pattern exhausts the type R, which is the type of expression being switched over in the original switch statement. Accordingly, the compiler 603 can conclude that the original switch statement is exhaustive and continues with compiling the source code (Operation 606). If there are no other errors resulting in any error notifications (Operation 607), the system generates a set of class files 608 based on the source code files 601 for execution on an execution platform 609.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
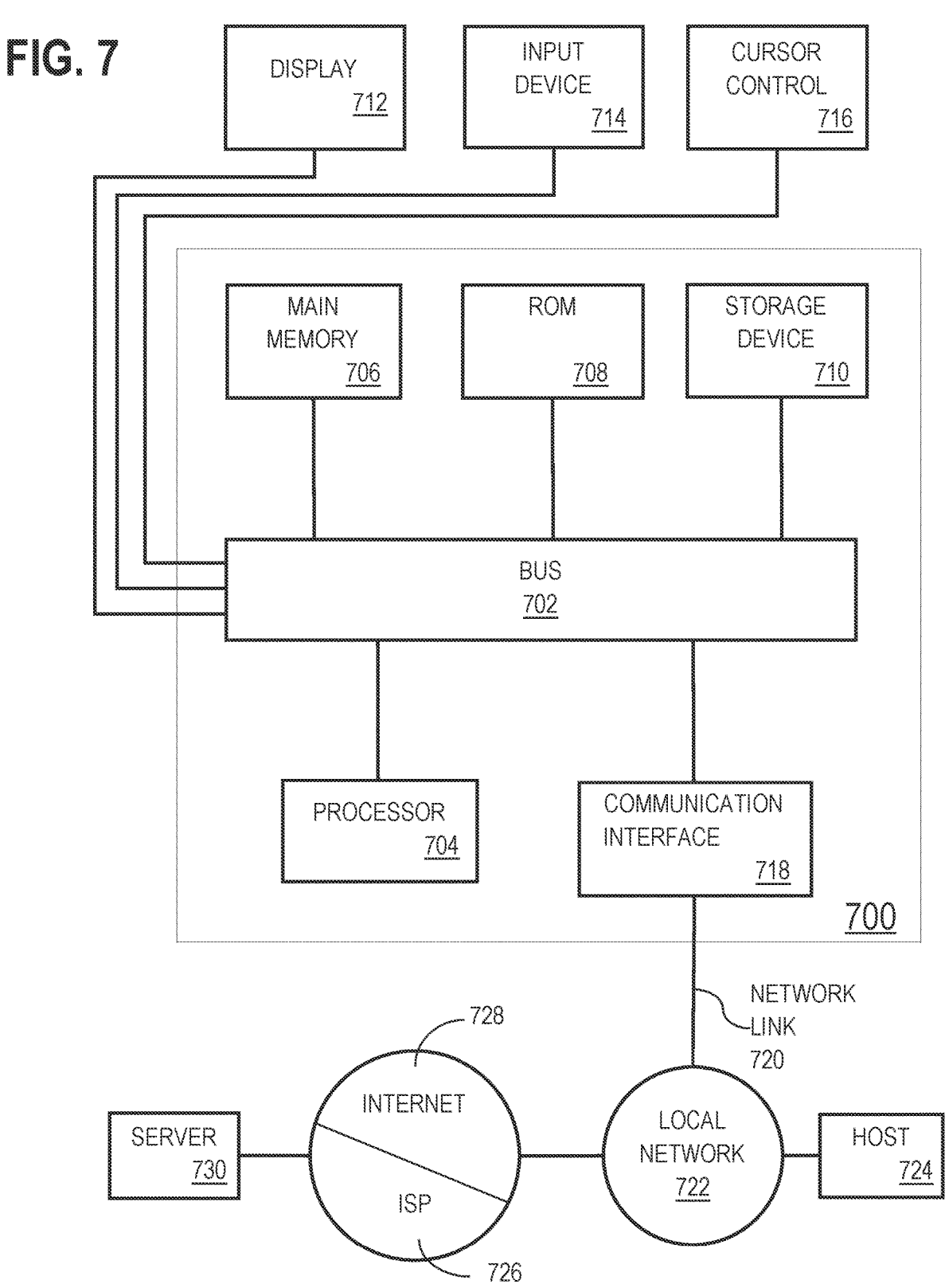
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:

obtaining, by a compiler, a set of source code;

identifying a switch block within the source code;

determining whether the switch block is exhaustive at least by:

identifying a set of case labels occurring within the switch block;

determining that a subset of two or more case labels, in the set of case labels, can be represented by a single case label;

replacing the two or more case labels with the single case label;

based at least on the single case label, determining that the switch block is exhaustive; and responsive at least to determining that the switch block is exhaustive, executing a compilation process to compile the set of source code.

2. The non-transitory computer readable medium of claim 1, wherein determining that the subset of two or more case labels can be represented by the single case label comprises determining that the two or more case labels exhaust the single case label.

3. The non-transitory computer readable medium of claim 2, wherein determining that the two or more case labels exhaust the single case label comprises determining that a set of types in the two or more case labels exhaust a particular type in the single case label.

4. The non-transitory computer readable medium of claim 1, wherein determining that the subset of two or more case labels can be represented by a single case label comprises determining that the two or more case labels include all possible variations that may correspond to the single case label.

5. The non-transitory computer readable medium of claim 1, wherein determining that the subset of two or more case labels can be represented by a single case label comprises determining that a set of types corresponding to the two or more case labels include all implementable types of an interface corresponding to the single case label.

6. The non-transitory computer readable medium of claim 1, wherein the operations further comprise:

prior to determining that the subset of two or more case labels can be represented by the single case label:

generating a particular case label of the two or more case labels at least by rewriting an initial case label as the particular case label based on the particular case label and the initial case label representing equivalent data.

7. The non-transitory computer readable medium of claim 1, wherein the operations further comprise:

prior to determining that the subset of two or more case labels can be represented by the single case label:

generating a particular case label of the two or more case labels at least by combining a first case label and a second case label to generate the particular case label.

8. The non-transitory computer readable medium of claim 7, wherein the operations further comprise:

rewriting an initial case label as the particular case label based on the particular case label and the initial case label representing equivalent data.

9. The non-transitory computer readable medium of claim 1, wherein the operations further comprise iteratively executing operations to combine case labels until a resulting set of case labels that exhausts the switch block is identified.

10. The non-transitory computer readable medium of claim 1, the operations further comprise iteratively executing operations to combine case labels until no further combining of case labels is possible.

11. A method comprising:

obtaining, by a compiler, a set of source code;

identifying a switch block within the source code;

determining whether the switch block is exhaustive at least by:

identifying a set of case labels occurring within the switch block;

determining that a subset of two or more case labels, in the set of case labels, can be represented by a single case label;

replacing the two or more case labels into the single case label;

based at least on the single case label, determining that the switch block is exhaustive; and responsive at least to determining that the switch block is exhaustive, executing a compilation process to compile the set of source code.

12. The method of claim 11, wherein determining that the subset of two or more case labels can be represented by a single case label comprises determining that the two or more case labels exhaust the single case label.

13. The method of claim 12, wherein determining that the two or more case labels exhaust the single case label comprises determining that a set of types in the two or more case labels exhaust a particular type in the single case label.

14. The method of claim 11, wherein determining that the subset of two or more case labels can be represented by a single case label comprises determining that the two or more case labels include all possible variations that may correspond to the single case label.

15. The method of claim 11, wherein determining that the subset of two or more case labels can be represented by a single case label comprises determining that a set of types corresponding to the two or more case labels include all implementable types of an interface corresponding to the single case label.

16. The method of claim 11, further comprising:

prior to determining that the subset of two or more case labels can be represented by a single case label:

generating a particular case label of the two or more case labels at least by rewriting an initial case label as the particular case label based on the particular case label and the initial case label representing equivalent data.

17. The method of claim 11, further comprising:

prior to determining that the subset of two or more case labels can be represented by a single case label:

generating a particular case label of the two or more case labels at least by combining a first case label and a second case label to generate the particular case label.

18. The method of claim 17, further comprising:

rewriting an initial case label as the particular case label based on the particular case label and the initial case label representing equivalent data.

19. The method of claim 11, further comprising: iteratively executing operations to combine case labels until a resulting set of case labels that exhausts the switch block is identified.

20. A system comprising:

one or more hardware processors; and one or more one or more non-transitory computer-readable media storing instructions, which when executed by the one or more hardware processors, cause execution of operations comprising:

obtaining, by a compiler, a set of source code;

identifying a switch block within the source code;

determining whether the switch block is exhaustive at least by:

identifying a set of case labels occurring within the switch block;

determining that a subset of two or more case labels, in the set of case labels, can be represented by a single case label;

replacing the two or more case labels into the single case label;

based at least on the single case label, determining that the switch block is exhaustive; and responsive at least to determining that the switch block is exhaustive, executing a compilation process to compile the set of source code.

* * * * *